W. J. GLOR.
CRANK SHAFT CONSTRUCTION.
APPLICATION FILED JULY 7, 1916.

1,363,466.

Patented Dec. 28, 1920.
2 SHEETS—SHEET 1.

Inventor:
William J. Glor.
By Hull, Smith, Buck & West

W. J. GLOR.
CRANK SHAFT CONSTRUCTION.
APPLICATION FILED JULY 7, 1916.

1,363,466.

Patented Dec. 28, 1920.
2 SHEETS—SHEET 2.

Inventor:
William J. Glor,
By Hull, Smith, Brock & West
Atty's

UNITED STATES PATENT OFFICE.

WILLIAM J. GLOR, OF CLEVELAND, OHIO.

CRANK-SHAFT CONSTRUCTION.

1,363,466. Specification of Letters Patent. Patented Dec. 28, 1920.

Application filed July 7, 1916. Serial No. 107,902.

*To all whom it may concern:*

Be it known that I, WILLIAM J. GLOR, a citizen of the United States, residing at Cleveland, in the county of Cuyahoga and State of Ohio, have invented a certain new and useful Improvement in Crank-Shaft Constructions, of which the following is a full, clear, and exact description, reference being had to the accompanying drawings.

This invention relates to crank shafts, and more particularly to built-up crank shafts for multi-cylinder engines. The general object of the invention is to provide a built-up shaft wherein each unit, including the crank pin or crank pins and connecting rod or rods will be in accurate centrifugal balance whereby the entire crank shaft will be balanced without any lateral thrust being exerted upon the bearings and the shaft will run with greater efficiency and smoothness than has been possible in any other construction with which I am familiar. A further object of the invention is to produce a crank shaft having the advantages hereinbefore referred to and which is also more economical to produce and construct than the ordinary one-piece crank shaft.

In the embodiments of my invention disclosed herein, the shaft is of the multi-disk type, each disk being so constructed and so connected to the adjacent crank pin or crank pins that the centrifugal action due to such crank pin or crank pins and connecting rod or rods is compensated for by correspondingly altering the mass of another portion of the disk in the radial plane of such connection. I may accomplish this compensation either by removing from the disk a mass of metal which will exactly compensate for the centrifugal action due to half the mass of the crank pin and its connections, or I may compensate such centrifugal action by adding to the disk a mass of metal equal to, or compensating for, half the mass of the crank pin and its connections; in either case, the alteration of the mass of the crank disks will be made in the radial plane including the crank pin connection.

Figure 1:
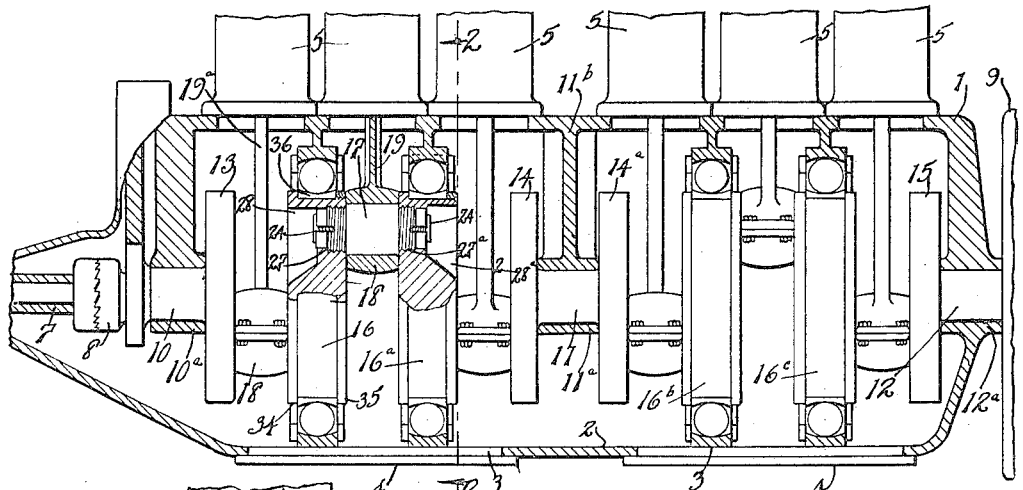
Figures 2, 3:
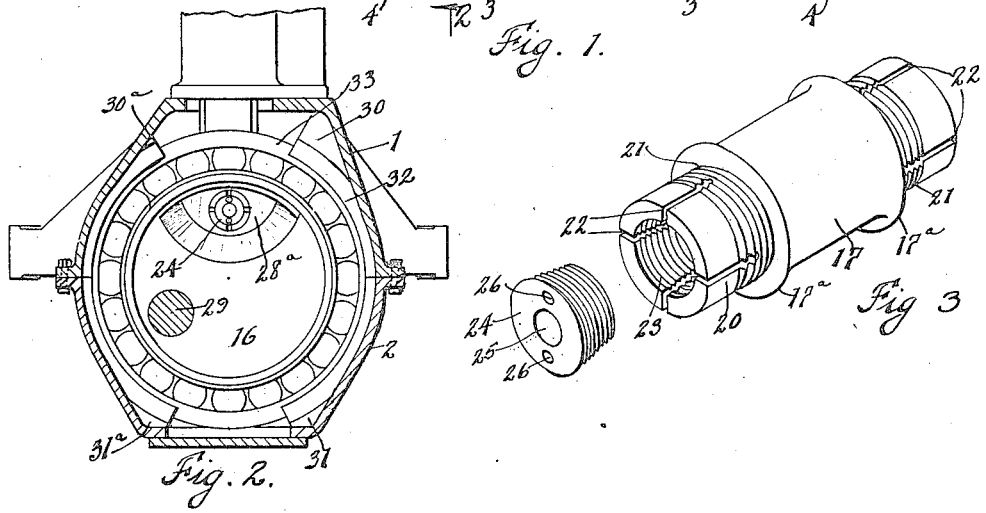
Figure 5:
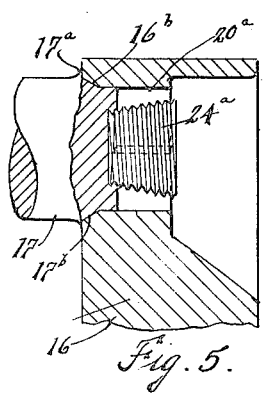
Figure 6:
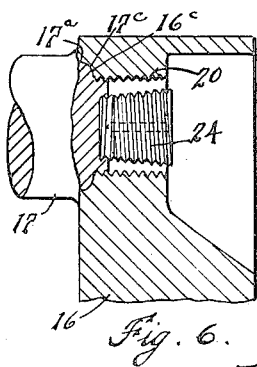
Figure 7:
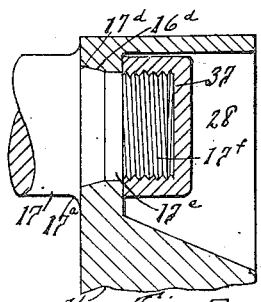
Figure 4:
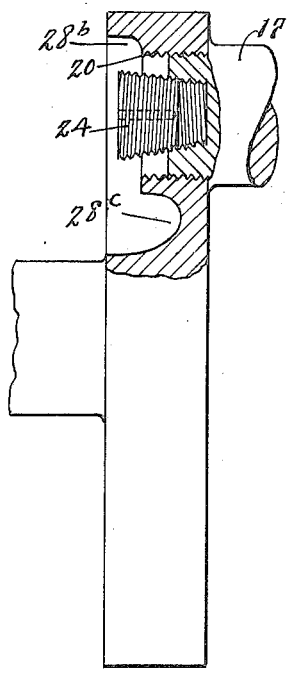
Figure 8:
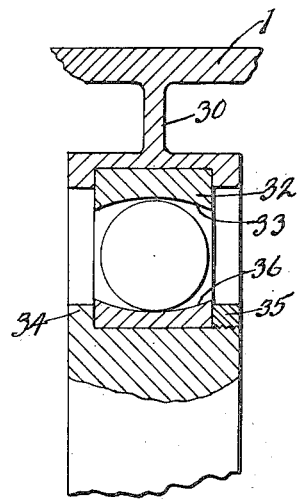

In the drawings forming part hereof, Figure 1 represents a longitudinal elevation of the crank case, cylinders, and crank shaft of a multi-cylinder engine, certain parts being shown in section, the crank shaft being constructed in accordance with my invention; Fig. 2 is a sectional view corresponding to the line 2—2 of Fig. 1 and looking in the direction of the arrows; Fig. 3 a detail in perspective of one of the crank pins shown in the preceding views; Fig. 4 is a detail, partly in section and partly in elevation, illustrating the connection between the crank pins and the end and central disks; Figs. 5, 6 and 7 are modifications, partly in section and partly in elevation, illustrating connections between crank pins and the crank disks; Fig. 8 a detail in section corresponding approximately to the line 8—8 of Fig. 2; and Fig. 9 an elevation of a modification of the crank shaft shown in Fig. 1.

Describing by reference characters the various parts illustrated herein, 1 denotes the upper section and 2 the lower removable section of a crank case of usual or standard construction, the lower section being provided with the usual openings 3 having the cover plates 4. 5 denotes the engine cylinders, a six-cylinder motor being shown for the purpose of illustration, although, so far as the principle of my invention is concerned, the number of cylinders is immaterial. 7 denotes the engine shaft, 8 the clutch, and 9 the fly wheel, the same being of usual or standard construction. In the particular embodiment illustrated herein, the crank shaft comprises three axial sections 10, 11 and 12, the sections 10 and 12 being end sections and the section 11 being the central section, these sections being supported in bearings $10^a$, $11^a$ and $12^a$, the bearings being of the ordinary split type. The upper section of the bearing $11^a$ is conveniently cast with the upper section 1 of the crank case, being carried by the rib $11^b$.

The shaft section 10 is connected to the center of a disk 13, the shaft section 11 to the centers of a pair of disks 14 and $14^a$ and the shaft section 12 to the center of a disk 15. The shaft section 10 and the disk 13 may be made as a single forging; so also may the shaft section 12 and disk 15 and the shaft section 11 and the disks 14 and $14^a$. The disks 13, 14, $14^a$ and 15 and the remaining disks, indicated at 16, 16ª, 16ᵇ, and 16ᶜ, are connected to the crank pins in the following manner:

Referring to Figs. 1 to 4 inclusive, each crank pin 17 is provided with the usual cylindrical body for the bearing 18 of the coöperating connecting rod 19, short flanges 17ª being provided at the ends of the cylindrical body. Each crank pin is provided with a pair of hollow extensions 20, said extensions being externally threaded adjacent to the flanges 17ª, as indicated at 21 and being longitudinally split, as indicated at 22, the interior of each such extension being tapered and threaded, as indicated at 23, for the reception of the correspondingly tapered and externally threaded plug 24, said plug being preferably bored, as shown at 25, and provided with apertures 26 for the application of a wrench. The extensions 20 of each crank pin are threaded into openings provided in adjacent disks, as indicated at 27, 27ª, Fig. 1, and the pin is rigidly connected to said disks by screwing the hollow expanding plugs 24 into the exensions 20. In order to compensate for the centrifugal action due to half of the mass of each crank pin and its connections, each disk is recessed, preferably in the side opposite that whereinto the crank pin projects, two such recesses being shown in Fig. 1 at 28 and 28ª, respectively, and each recess being shown as coincident with the crank pin connection whereby its compensating effort or movement will be particularly effective.

The mass of metal which is missing from the side of the disk opposite the crank pin connection may be considered as exerting a negative centrifugal action to compensate for the positive centrifugal action due to half the mass of the crank pin and connecting rod opposite thereto. It will be observed that the recess is symmetrical on both sides of a radial plane including the axis of the crank pin connection. To secure perfect centrifugal compensation, this arrangement is necessary. If we consider that the recess, instead of being formed in the forging operation, as produced by the physical removal of a mass of iron from the disk, the center of gravity of such removed mass will be substantially coincident with the radial plane including the axis of the crank pin connection. While I have shown the disk as provided with a recess on the opposite side from the crank pin connection and at substantially the same radial distance from the center of the disk as such connection, this is not necessary to secure centrifugal compensation, as the same result may be accomplished by forming the recess in the same side of the disk as the crank pin connection which it is to compensate, provided that the mass center of the recess coincides with a radial plane including the axis of the crank pin connection. Furthermore, it is not necessary that the center of the recess shall be at the same radial distance from the center of the disk as the crank pin connection, it being understood that the mass of metal removed or absent from the disk in forming the recess will vary inversely with its distance from the center of the disk.

In Fig. 4 there is illustrated the manner of compensating the end and central disks for the centrifugal effort due to half the mass of the crank pin and its connections. Because of the comparative thinness of these disks, the part of the recess which is immediately opposite the crank pin is comparatively shallow, whereby a sufficient thickness of metal will be preserved for the connection to enable the disk to withstand the strains to which it is subjected. As the crank pin and its connections will be the same in the case of these thinner disks as in the case of the thicker disks, the compensation will be effected by deepening the recess toward the center of the disk, as indicated at 28ᶜ, there being ample area of metal to withstand the strains at this point.

In practical operation, the mass of each crank pin and its connections (the connecting rod and its bearings) will be known. In forging the crank disk, the mass of metal necessary to fill the recess or recesses forged therein will be substantially equal to, or substantially the same amount of opposing centrifugal force as, the mass of half the crank pin and connections, but will preferably be slightly less so that any difference may be easily made up by boring or otherwise removing a slight quantity of metal from the disk. In practice, however, this subsequent removal of metal will be required infrequently, since the mass of each crank pin and its connecting rod can be accurately determined. It will be understood that the connecting rods are connected to the crank sections in the manner usually followed in six-cylinder installations; that is to say, the crank pin 17 will be connected to the crank disk 16 120° from the crank pin to which the connecting rod 19ª is connected; and so on throughout the remaining crank disks, this arrangement and the order of firing the cylinders insuring the crank receiving an impulse at every sixty degrees of its revolution. The connection between the disk 13 and its crank pin will be compensated for in the same manner as described in connection with the disks 16 and 16ª, and the connection between the disks 16ª and 14 and their crank pin will be compensated for in like manner, and so on throughout the entire series of the crank disks.

The construction of the disks 16, 16ª, etc., lends itself readily to coöperation with antifriction bearings by which the crank may be steadied in case there is any tendency of the same to weave. The anti-friction bearings shown herein are ball bearings, the outer ball race being provided by two pairs of segmental ribs, preferably formed with the crank case sections. Each rib comprises a web (see Figs. 2 and 8), the webs of the upper ribs being indicated at 30 and 30ª and the webs of the lower ribs being indicated at 31 and 31ª. Formed with each rib segment is the outer ball race 32 having a concave channel 33 for the balls. The periphery of each of the disks 16 and 16ᶜ is provided with a fixed ring 34 and a removable ring 35 which may be threaded onto the side opposite the fixed ring. The rings of each disk support the inner ball race 36. This construction will be advantageous in the event that there is any weaving of the crank shaft, but, with my construction, any weaving due to the parts being out of balance will be obviated.

In Figs. 5, 6 and 7 there are shown modifications of the connection between the crank pins and the disk. In the first of these figures, the crank pin 17 is provided with a frusto-conical surface 17ᵇ just beyond the flange 17ª, which frusto-conical surface is adapted to engage a correspondingly tapered surface 16ᵇ in the crank disk aperture. The extension 20ª in this case is shown as provided with no external thread, but the extension is split, as in the case of the preceding modification, and is provided with a threaded tapered bore which is adapted to receive the expanding plug 24ª, shown as being substantially identical with the plug 24, the only difference being that the exterior is tapered at a greater angle than is the case with the plug 24.

In Fig. 6 there is shown a still further modification wherein the crank pin 17 is provided outside of each flange 17ª with a rounded portion 17ᶜ adapted to engage a corresponding rounded seat 16ᶜ in the adjacent side of the crank disk. The extensions 20 are shown as identical with the extensions 20 in the first form of my invention and the expanding plug 24 is shown as identical with the like numbered plug in Figs. 1-3.

In Fig. 7 there is shown a still further modification of the connection between the crank pin and the adjacent disks. In this view, each crank pin 17 is shown as provided in each flange 17ª thereof with a frusto-conical or tapered portion 17ᵈ which is adapted to engage a correspondingly shaped seat 16ᵈ in the adjacent crank disk. Extending from the tapered portion 17ᵈ there is a cylindrical portion 17ᵉ which projects into the recess 28, the portion which so projects being threaded, as indicated at 17ᶠ, for the reception of an internally threaded cap 37.

In the embodiments of my invention heretofore illustrated and discussed, each disk is compensated for half of each crank pin and connections connected thereto by removing a portion of the disk.

Figure 9:
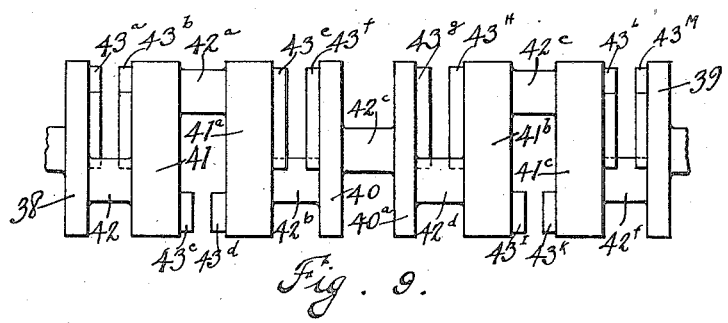

In Fig. 9 I have shown a modification wherein this compensation is effected by increasing the mass of each disk on the same side as such connection but diametrically opposite thereto in such manner that a perfect centrifugal balance will be obtained. The manner of compensating is shown in Fig. 9. In this figure, the end disks are indicated at 38 and 39, the central disks at 40, 40ª and the remaining disks at 41, 41ª, 41ᵇ and 41ᶜ, and the crank pins at 42—42ᶠ. The particular manner in which this compensation is shown herein is by forging on each disk, on the same side thereof as the crank pin connection, a mass of metal which will exert exactly the same centrifugal action on the disk as half the mass of the crank pin and its connections, the various counterweights being indicated at 43ª—43ᵐ.

In all embodiments of my invention disclosed herein, the compensation is effected by altering the mass of each disk in a radial plane or planes each including a crank pin connection, such alteration being entirely within the periphery of the disk—between such periphery and the center of the disk.

Having thus described my invention, what I claim is:—

1. A built-up crank shaft comprising a plurality of crank disks and crank pins, each of said disks having its mass altered in radial planes including the crank pin connections, thereby to compensate for the centrifugal effort due to a crank pin and its connections, the mass being altered entirely within the peripheral portion of said disk and the alterations being symmetrical on both sides of each of said planes.

2. A built-up crank shaft comprising one or more intermediate crank disks, each of said disks having a pair of crank pins connected thereto, the mass of each disk being altered in radial planes each including a crank pin connection, thereby to compensate for the centrifugal effort due to such crank pin and its connections, the mass being altered entirely within the periphery of the disk and the alterations in mass being symmetrical on both sides of each of said planes.

3. A built-up crank shaft comprising a plurality of intermediate forged disks each of said disks having a pair of crank pins connected thereto, the mass of each disk being altered during the forging thereof in radial planes each of which includes a crank pin and its connection, thereby to compensate for the centrifugal effort due to each crank pin and its connections, the mass being altered entirely within the periphery of the disk and the alterations in mass being symmetrical on both sides of each of said planes.

4. A crank disk having a crank pin connected to one side thereof and being recessed in a radial plane including the crank pin connection with the disk, thereby to compensate for the centrifugal effort exerted by half of the mass of the crank pin and its connections.

5. A crank shaft for multi-cylinder engines comprising a plurality of crank disks each having a crank pin detachably connected thereto, each disk having in the face opposite the crank pin connection and substantially coincident with such connection a recess thereby to compensate for substantially half of the mass of the crank pin and its connections.

In testimony whereof, I hereunto affix my signature.

WILLIAM J. GLOR.